Feb. 9, 1932.   H. F. SMITH   1,844,528

REFRIGERATING APPARATUS

Filed March 31, 1930

Harry F. Smith INVENTOR

BY

Spencer Hardman & Fehr ATTORNEYS

Patented Feb. 9, 1932

1,844,528

UNITED STATES PATENT OFFICE

HARRY F. SMITH, OF DAYTON, OHIO, ASSIGNOR TO FRIGIDAIRE CORPORATION, OF DAYTON, OHIO, A CORPORATION OF DELAWARE

REFRIGERATING APPARATUS

Application filed March 31, 1930. Serial No. 440,497.

This invention relates to refrigerating apparatus and particularly to valves used in such apparatus.

One of the objects of the invention is to provide an improved valve which is positive and reliable in operation and simple and inexpensive to manufacture.

More specifically it is an object to provide a valve which is fluid-tight under relatively high pressure and which may be constructed without precise manufacturing or assembling operations.

Further objects and advantages of the present invention will be apparent from the following description, reference being had to the accompanying drawings, wherein a preferred form of the present invention is clearly shown.

Figure 1:
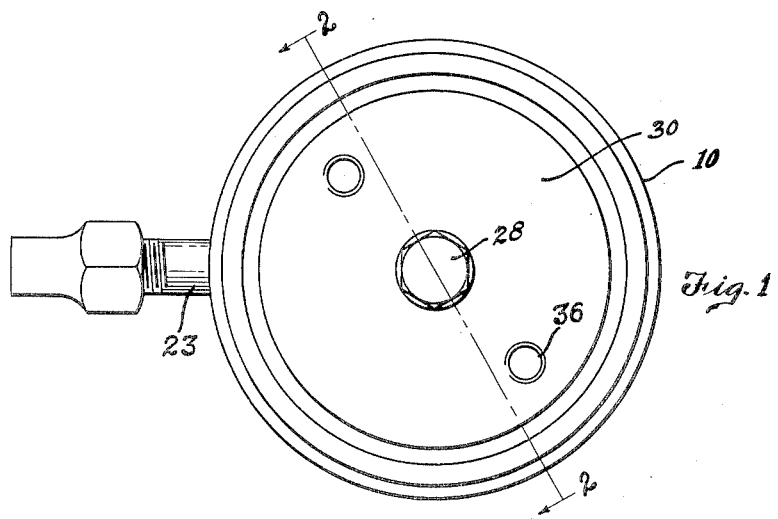
Fig. 1 is an end elevation of a valve constructed in accordance with the present invention.
Figures 2, 3:
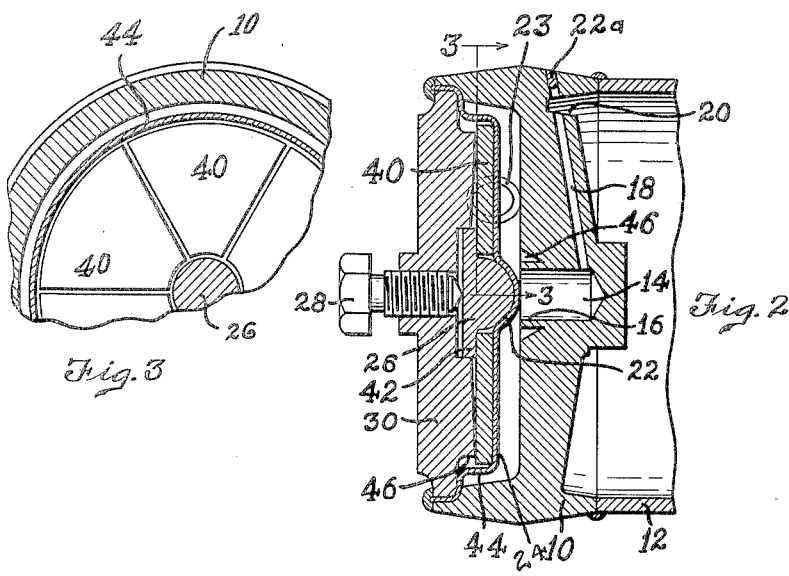
Fig. 2 is a section on the line 2—2 of Fig. 1.
Fig. 3 is a fragmentary section on the line 3—3 of Fig. 2.

The valve includes a cup-shaped body or base 10 which may be a forging and which is adapted to be welded to the end of a cylindrical container 12 to form a closure for the container. A passage 14, surrounded by a valve seat 16, communicates with the interior of the container through a duct 18 which may be formed by drilling a hole from the outside of the body radially into the passage 14 through a recess 20 and thereafter stopping the end of this hole as by welding at 22a. The passage 14 affords communication between a connection or tube 23 and the container 12. A cup-shaped diaphragm 24 is welded over the mouth of the cup-shaped body 10 and may be provided with a projection 22, forming the valve proper, which is adapted to be closed against the seat 16 by a block 26 urged against the diaphragm by screw 28 threaded in the top 30 which is welded to the body 10 with the diaphragm. The top is provided with screw-threaded openings 36 which enable the valve and the container to be secured to any suitable support, if desired.

The seat 16 is preferably circular and the projection 22 is therefore circular in cross-section in a plane parallel to the seat; for example the projection is preferably but not necessarily spherical. The diaphragm is constructed of a material having definite but low elasticity and a relatively high plasticity, the elasticity being sufficient to remove the diaphragm from the seat, when permitted by the screw 28, a distance sufficient to afford the full effective opening of the passage 14, that is approximately one-tenth of the diameter of the opening. In other words, the motion of the projection 22 between full opening and positive closing of the valve occurs within the elastic limit of the diaphragm. The diaphragm is further designed to have high plasticity to permit the construction of the valve without requiring accurate manufacturing and assembling operations and to allow adjustment of the diaphragm after the valve is assembled. Should the valve be assembled with the diaphragm too far away from the seat the screw 28 is used to force the diaphragm against the seat. This will deform the diaphragm beyond its elastic limit and give it a new shape or set after which the diaphragm may be unseated by its own elasticity. Likewise should the valve be assembled with the diaphragm too close to the seat the screw 28 may be unscrewed far enough to permit the diaphragm to be fully opened and the diaphragm may be forced away from the seat and given a new permanent set by pressure applied to its underside through the conduit 23. Thereafter the diaphragm may be seated and unseated within its elastic limit. Soft steel such as is known in the trade as deep drawing steel is a suitable material for the diaphragm.

In order to prevent bulging of the diaphragm between the valve proper and the periphery under the influence of high pressure in the conduit 23 I provide rigid backing or thrust members 40. Preferably these members are substantially of sector form and lie beneath a flange 42 on the pressure block 26 so as to follow the diaphragm when the latter is closed on the seat by the screw. The outer edges of the thrust members terminate adjacent the periphery of the diaphragm and are held in place by the cup-wall 44 formed on the diaphragm. Preferably the members are so assembled that they are held against the edge 46 of the head 30 by the outer edge or cup-wall of the diaphragm and may pivot on this edge in their movement between the open and closed positions of the valve. When the valve is closed on its seat the thrust block 26 and the thrust members 40 form a rigid supporting surface which covers substantially the entire area of the diaphragm and thus prevents bulging of the diaphragm under pressure. It is desirable to prevent such bulging because the low elastic limit of the diaphragm would otherwise permit the valve, when in operation, to be given an undesirable set which might even prevent the valve from opening.

Preferably the seat 16 is formed as a thin tube by cutting a circular groove 46 around the opening in the valve body so as to leave the tube, or else the seat may be formed by inserting a separate tube and securing it to the valve body in any desired fluid-tight manner. This thin-walled tube is deformable because of its elasticity and plasticity. Soft steel such as is used for the diaphragm may also be used to form the body 10 and valve seat 16. This deformable seat also aids in the construction of a valve which closes tightly but which does not require accurate operations either in finishing the seat or diaphragm. If the projection 22 is not perfectly circular or perfectly smooth, or if the diaphragm is not accurately centered with respect to the seat, the projection deforms the tubular seat when forced against it by the screw so that the projection and seat accurately conform to each other. Moreover, since the periphery of the diaphragm is fixed with relation to the seat, the same points on the diaphragm always contact with the same points on the seat. Therefore after the seat has once been deformed by the first seating of the valve, particularly if the seat is deformed beyond its elastic limit, the seat and valve always fit each other accurately. Consequently in operation the valve may be positively closed by slight force on the screw 28.

While the form of embodiment of the invention as herein disclosed, constitutes a preferred form, it is to be understood that other forms might be adopted, all coming within the scope of the claims which follow.

What is claimed is as follows:

1. A valve comprising in combination a deformable seat, a flexible diaphragm, and means for holding the diaphragm against the seat to deform the latter to effect sealing contact with the diaphragm.

2. A valve comprising in combination a deformable tube, a seat on the end of the tube, a flexible diaphragm including a projection adapted to engage the end of the tube, and means for holding the projection against the seat to deform the tube.

3. A valve comprising in combination a plastic tube, a seat on the end of the tube, a flexible diaphragm including a projection adapted to engage the end of the tube, and means for holding the projection against the seat to deform the tube to effect sealing contact with the projection.

4. A valve comprising in combination a tube which is both plastic and elastic, a seat on the end of the tube, a flexible diaphragm including a projection adapted to engage the end of the tube, and means for holding the projection against the seat to deform the tube to effect sealing contact with the projection.

5. A valve comprising in combination a tube having a relatively low elastic limit and relatively high plasticity, a seat on the end of the tube, an elastic diaphragm including a projection adapted to engage the end of the tube, and means for holding the projection against the seat to deform the latter to effect sealing contact with the projection.

6. A valve comprising in combination a deformable circular seat, an elastic diaphragm including a substantially spherical projection adapted to engage the seat, and means for holding the projection against the seat to deform the latter to effect sealing contact with the projection.

7. A valve comprising in combination a seat, a diaphragm whose periphery is fixed with respect to the seat, said seat being located substantially opposite the center of the diaphragm, said diaphragm being both plastic and elastic, and means for deforming the diaphragm beyond its elastic limit to cause the diaphragm to flow to compensate for irregularities in placing the diaphragm with respect to the seat.

8. A valve comprising in combination a seat, a diaphragm whose periphery is fixed with respect to the seat, said diaphragm having a relatively low elastic limit and a relatively high plasticity, and means for deforming the diaphragm beyond its elastic limit to cause the diaphragm to engage the seat, said diaphragm being thereafter adapted to disengage itself from the seat by its own elasticity when said means is removed, and said means being adapted to hold the diaphragm against its seat within its elastic limit thereafter.

9. The method of assembling and fitting a valve which comprises fixing the periphery of a plastic and elastic diaphragm with respect to a seat, deforming the diaphragm beyond its elastic limit to cause the diaphragm to engage the seat thereby giving the diaphragm a desired shape and a desired position with relation to the seat, said diaphragm thereafter adapted to move within its elastic limit to unseat the diaphragm.

10. A valve comprising in combination a flexible diaphragm fixed at its periphery, a valve seat substantially opposite the center of the diaphragm, a rigid thrust member for holding the center of the diaphragm against the seat and rigid thrust members extending from said first mentioned thrust member to points adjacent the periphery of the diaphragm, said second mentioned thrust members being pivoted adjacent the periphery of the diaphragm.

In testimony whereof I hereto affix my signature.

HARRY F. SMITH.